US011403580B2

(12) United States Patent
Zulpa et al.

(10) Patent No.: US 11,403,580 B2
(45) Date of Patent: Aug. 2, 2022

(54) ADVISING AUDIT RATINGS IN A MULTIPLE-AUDITOR ENVIRONMENT

(71) Applicant: International Business Machines Corporation, Armonk, NY (US)

(72) Inventors: Paul A. Zulpa, Woodbury, CT (US); Zhipeng Wang, Zhongshan (CN); Matthew S. Kelly, Oakville (CA); Feng Xue, Singapore (SG); Lin Zhao, Shenzhen (CN); WeiFeng Zhang, Shenzhen (CN); Jeffrey G. Komatsu, Kasson, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 538 days.

(21) Appl. No.: 16/030,049

(22) Filed: Jul. 9, 2018

(65) Prior Publication Data

US 2020/0012987 A1 Jan. 9, 2020

(51) Int. Cl.
*G06Q 10/06* (2012.01)

(52) U.S. Cl.
CPC .............................. *G06Q 10/06395* (2013.01)

(58) Field of Classification Search
None
See application file for complete search history.

(56) References Cited

U.S. PATENT DOCUMENTS 5,912,696 A * 6/1999 Buehl ................ H04N 21/4532
455/26.1

6,839,850 B1 1/2005 Campbell
7,346,527 B2 3/2008 McKay
(Continued)

FOREIGN PATENT DOCUMENTS

| CN | 105335814 A | 2/2016 | |
|---|---|---|---|
| WO | 2016191369 A1 | 12/2016 | |
| WO | WO-2021019463 A1 * | 2/2021 | ........... G06F 21/577 |

OTHER PUBLICATIONS

Ingrid E. Fisher, Margaret R. Garnsey and Mark E. Hughes, Natural Language Processing in Accounting, Auditing and Finance: A Synthesis of the Literature With a Roadmap for Future Research, Intell. Sys. Acc. Fin. Mgmt. 23, 157-214 (2016).*

(Continued)

*Primary Examiner* — Jerry O'Connor
*Assistant Examiner* — Philip N Warner
(74) *Attorney, Agent, or Firm* — Cantor Colburn LLP; Tihon Poltavets

(57) ABSTRACT

A computer-implemented method includes assigning an auditor weight to each user of a plurality of users. A plurality of audit data is received from the plurality of users, where each audit data is associated with a respective user and includes a set of user ratings for an audit. Final ratings are generated for the audit, with a respective final rating for each item in the audit. Generating the final rating of a first item in the audit includes identifying, in the audit data, user ratings for the first item. The user ratings for the first item include a respective user rating of the first item from each user. Generating the final rating of a first item further includes calculating the final rating of the first item based on a weighted combination of the plurality of user ratings for the first item, according to the respective auditor weight of each user.

19 Claims, 7 Drawing Sheets

(56) References Cited

U.S. PATENT DOCUMENTS

| | | | |
|---|---|---|---|
| 8,266,024 | B2 | 9/2012 | Hahn-Carlson |
| 8,396,811 | B1 | 3/2013 | Hahn-Carlson |
| 8,640,205 | B2 | 1/2014 | Weaver |
| 8,731,954 | B2 | 5/2014 | Heinze |
| 9,026,405 | B2 | 5/2015 | Buckley |
| 9,202,183 | B2 | 12/2015 | Price |
| 9,317,574 | B1 | 4/2016 | Brisebois |
| 9,792,330 | B1* | 10/2017 | Hawkins ............ G06F 16/24573 |
| 9,996,666 | B1* | 6/2018 | Wilson ................ G06F 16/9537 |
| 10,261,953 | B2* | 4/2019 | Richardson ............. G06F 16/93 |
| 10,521,752 | B1* | 12/2019 | Williamson ... G06Q 10/063114 |
| 2004/0093293 | A1* | 5/2004 | Cheung ................. G06Q 40/06 705/36 R |
| 2004/0260582 | A1 | 12/2004 | King |
| 2005/0086534 | A1* | 4/2005 | Hindawi .................... G06F 8/65 726/4 |
| 2005/0141565 | A1* | 6/2005 | Forest .................... H04L 12/44 370/503 |
| 2006/0259471 | A1* | 11/2006 | Droubie ................. G06Q 99/00 |
| 2007/0162361 | A1* | 7/2007 | Kleemann ............. G06Q 40/12 705/30 |
| 2007/0192478 | A1 | 8/2007 | Louie |
| 2007/0226211 | A1* | 9/2007 | Heinze ................... G06F 16/93 |
| 2009/0089126 | A1 | 4/2009 | Odubiyi |
| 2010/0023353 | A1* | 1/2010 | Stoffiere ................ G06Q 10/10 715/764 |
| 2012/0022897 | A1* | 1/2012 | Shafer .................... G06Q 40/08 705/4 |
| 2013/0282600 | A1 | 10/2013 | Zeng |
| 2014/0278638 | A1* | 9/2014 | Kreuzkamp ...... G06Q 10/06398 705/7.15 |
| 2014/0304008 | A1* | 10/2014 | Dorris .................... G06Q 40/08 705/4 |
| 2015/0066576 | A1* | 3/2015 | Modess ............. G06Q 10/0635 705/7.28 |
| 2015/0161195 | A1 | 6/2015 | Neal, Jr. |
| 2015/0254680 | A1* | 9/2015 | Scoles .................... G06F 16/951 705/7.29 |
| 2016/0048900 | A1* | 2/2016 | Shuman ............. G06Q 30/0204 705/7.33 |
| 2016/0110679 | A1 | 4/2016 | Putnam |
| 2017/0052536 | A1* | 2/2017 | Warner ............ G06Q 10/06312 |
| 2017/0052959 | A1* | 2/2017 | Felske ............... G06F 16/24578 |
| 2018/0285996 | A1* | 10/2018 | Ma ........................ H04L 9/3297 |
| 2018/0357605 | A1* | 12/2018 | Montgomery ........ G06Q 10/103 |
| 2019/0164097 | A1* | 5/2019 | Gupta .................... G06N 20/00 |
| 2019/0164232 | A1* | 5/2019 | DeLuca ............. G06F 16/3344 |
| 2019/0171801 | A1* | 6/2019 | Barday ................. G06F 21/316 |
| 2019/0258985 | A1* | 8/2019 | Guastella ............... G06N 20/00 |
| 2019/0385071 | A1* | 12/2019 | Von Bencke .......... G06N 7/005 |
| 2020/0012653 | A1* | 1/2020 | Mehta ............. G06Q 10/063112 |
| 2020/0090233 | A1* | 3/2020 | D'Alfonso ........ G06F 16/24573 |

OTHER PUBLICATIONS

Dereli et al., "Fuzzy quality-team formation for value added auditing: A case study", Journal of Engineering and Technology Management, vol. 24, No. 4, pp. 366-394, 2007.

* cited by examiner

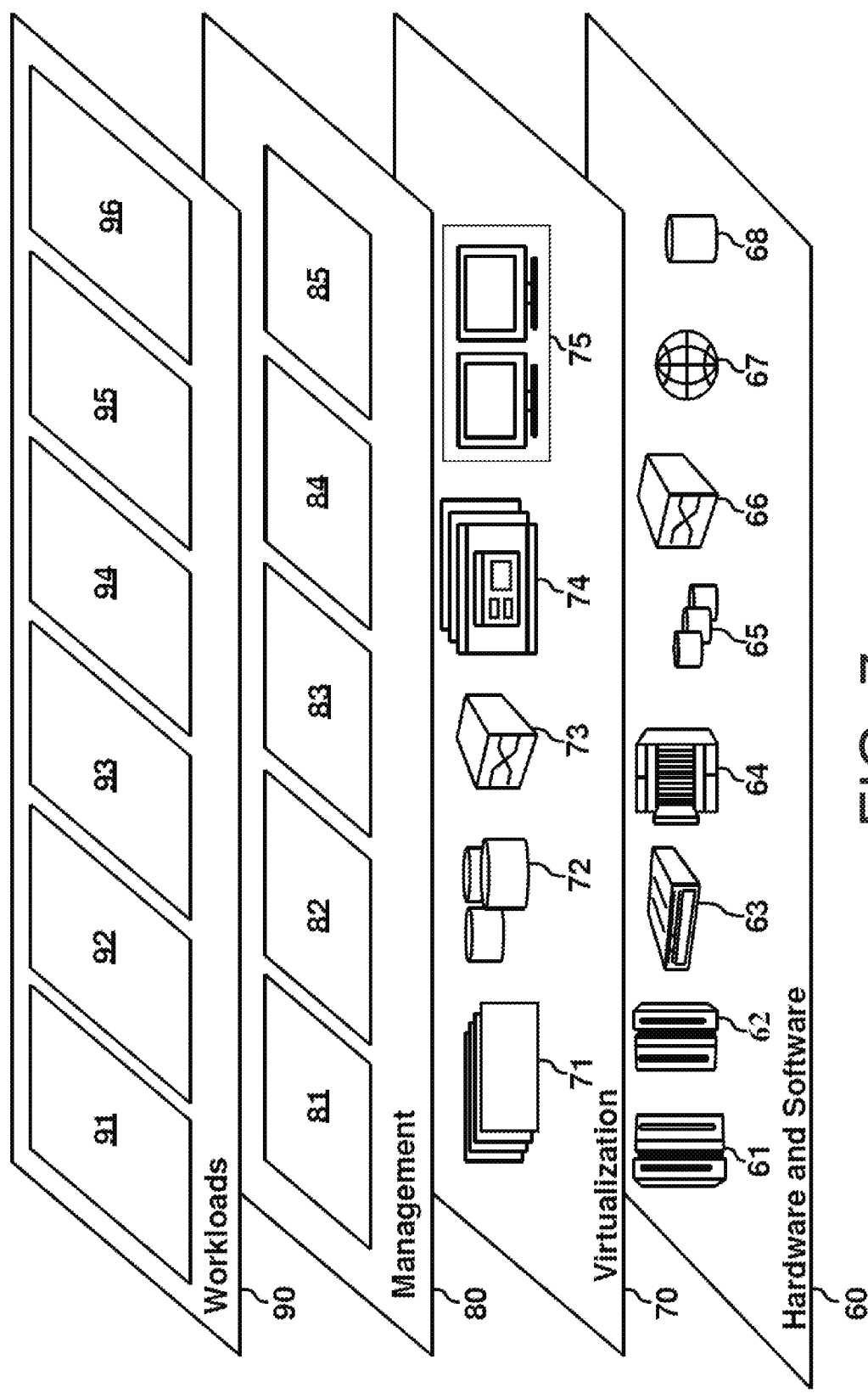

ADVISING AUDIT RATINGS IN A MULTIPLE-AUDITOR ENVIRONMENT

BACKGROUND

The present invention relates to auditing and, more specifically, to advising audit ratings in a multiple-auditor environment.

Companies across numerous industries perform various types of audits, such as quality audits, operation audits, and International Standards Organization (ISO) audits, both internally and externally. Audits generally utilize checklists and fall into two classes in terms of how a checklist is used: checklist audits and freeform audits. Additionally, audits generally use one of two rating types: scores and discrete ratings.

An audit checklist sets out all items, or questions, to be considered during a checklist audit. Each auditor assesses each item based on available evidence, and for each item, the auditor provides a rating, which can either be a score (e.g., in an established range) or a discrete rating (e.g., Major, Minor, etc.). This type of audit is often referred to as having a checklist-based flow.

In a freeform audit, a checklist is used by auditors to pre-study the entity being audited and as a reference during the audit. The actual audit, however, is not conducted through strictly following the checklist. In some cases, an audit agenda may be established to provide guidance as to how the audit proceeds. As the audit proceeds, each auditor generates audit observations, also referred to as audit notes, according to the agenda or otherwise. Each auditor later extracts his or her findings and assigns a discrete rating to each finding. While scores could theoretically be used as ratings in a freeform audit, it is generally not practical to do so given that not every auditor will be considering the same items, as in a checklist audit. This type of audit is often referred to as having a freeform-based flow.

SUMMARY

Embodiments of the present invention are directed to a computer-implemented method for audit advising. A non-limiting example of the computer-implemented method includes assigning a respective auditor weight to each user of a plurality of users. A plurality of audit data is received from the plurality of users, where each audit data is associated with a respective user of the plurality of users and includes a set of user ratings for an audit. The audit includes a plurality of items. A plurality of final ratings are generated for the audit, with a respective final rating for each item in the audit. Generating the respective final rating of a first item in the audit includes identifying, in the plurality of audit data, a plurality of user ratings for the first item. The plurality of user ratings for the first item include a respective user rating of the first item from each user of the plurality of users. Generating the respective final rating of a first item in the audit further includes calculating the respective final rating of the first item based on a weighted combination of the plurality of user ratings for the first item, according to the respective auditor weight of each user.

Embodiments of the present invention are directed to a system for audit advising. A non-limiting example of the system includes a memory having computer-readable instructions and one or more processors for executing the computer-readable instructions. The computer-readable instructions include assigning a respective auditor weight to each user of a plurality of users. Further according to the computer-readable instructions, a plurality of audit data is received from the plurality of users, where each audit data is associated with a respective user of the plurality of users and includes a set of user ratings for an audit. The audit includes a plurality of items. A plurality of final ratings are generated for the audit, with a respective final rating for each item in the audit. Generating the respective final rating of a first item in the audit includes identifying, in the plurality of audit data, a plurality of user ratings for the first item. The plurality of user ratings for the first item include a respective user rating of the first item from each user of the plurality of users. Generating the respective final rating of a first item in the audit further includes calculating the respective final rating of the first item based on a weighted combination of the plurality of user ratings for the first item, according to the respective auditor weight of each user.

Embodiments of the invention are directed to a computer-program product for audit advising, the computer-program product including a computer-readable storage medium having program instructions embodied therewith. The program instructions are executable by a processor to cause the processor to perform a method. A non-limiting example of the method includes assigning a respective auditor weight to each user of a plurality of users. Further according to the method, a plurality of audit data is received from the plurality of users, where each audit data is associated with a respective user of the plurality of users and includes a set of user ratings for an audit. The audit includes a plurality of items. A plurality of final ratings are generated for the audit, with a respective final rating for each item in the audit. Generating the respective final rating of a first item in the audit includes identifying, in the plurality of audit data, a plurality of user ratings for the first item. The plurality of user ratings for the first item include a respective user rating of the first item from each user of the plurality of users. Generating the respective final rating of a first item in the audit further includes calculating the respective final rating of the first item based on a weighted combination of the plurality of user ratings for the first item, according to the respective auditor weight of each user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 is a block diagram of abstraction model layers, according to some embodiments of this invention.

Figure 1:
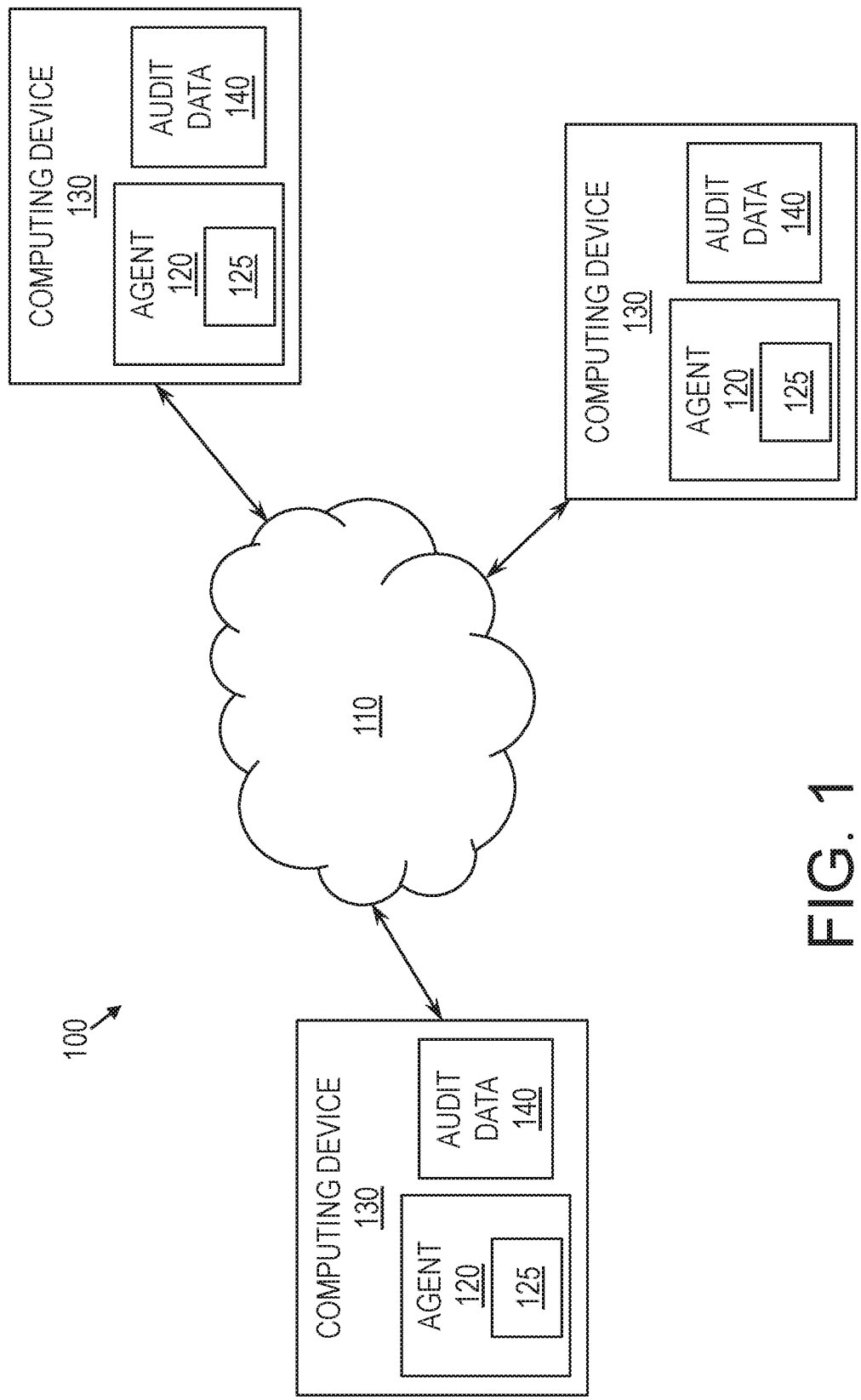
FIG. 1 is a diagram of an auditing system, according to some embodiments of this disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in modern audits, findings and ratings are generally recorded on paper during an audit. When the audit involves multiple auditors, those auditors must set time aside to consolidate notes and to prepare final ratings and a final audit report. Especially with a large number of auditors, this task can be tedious and time-consuming, even though most of the substantive work has already been completed. Further, if the audit spans a long period of time (e.g., five days), it may be necessary for the auditors to meet multiple times to consolidate findings and determine ratings, to ensure that the audit remains on track.

Turning now to an overview of the aspects of the invention, one or more embodiments of the invention address the above-described shortcomings of the prior art by providing an auditing system that determines scores or discrete ratings based on the ratings of individual auditors. Further, the auditing system enables audit data, including notes and findings, to be easily consolidated. More specifically, each auditor may be assigned a respective auditor expertise index, on which a respective auditor weight may be determined. For each item (e.g., checklist question) in an audit using scores, the auditing system may determine a score rating (i.e., a score) as a weighted combination of the various scores determined by the auditors, based on the respective auditor weights of the auditors. For each item (e.g., checklist question, freeform observation) in an audit using discrete ratings, the auditing system may determine a discrete rating by weighting votes from the various auditors, based on their respective auditor weights. The determined ratings may be provided to an audit leader, or other user, as advised ratings.

The above-described aspects of the invention address the shortcomings of the prior art by providing an improved auditing system, by enabling a specific mechanism of automating ratings and automating consolidation of audit data of individual auditors. With embodiments of the auditing system described herein, audits can be completed more efficiently and more accurately, with preference given to certain auditors with higher auditor experiences indices, in a systematic way that preserves objectivity.

Turning now to a more detailed description of aspects of the present invention, FIG. 1 is a diagram of an auditing system 100, according to some embodiments of the invention. Generally, the auditing system 100 may determine a rating for each item in an audit, where each such rating may be considered an advised rating or a recommendation, which may be manually accepted or changed. When that audit is checklist-based, the auditing system 100 may determine a rating for each item (e.g., question) in the checklist. When the audit is freeform, the auditing system 100 may determine a rating for each observation in the audit, as will be described further below. Each rating may be a discrete rating or a score. In some embodiments of the invention, for a particular audit, all ratings may be discrete or all ratings may be scores. The one or more ratings generated by the auditing system 100 need not be used by auditors without further consideration. Rather, the auditing system 100 may be used to provide one or more ratings used as recommendations. Thus, while certain ratings are referred to herein as "final," it will be understood that "final" refers to a potential stopping point with respect to generating such ratings and that further modification to these ratings may be made.

In some embodiments of the invention, the auditing system 100 is cloud-based. As shown in FIG. 1, the auditing system 100 may include a cloud 110 and one or more agents 120. The cloud 110 may include one or more servers, or one or more portions of servers, configured to perform or facilitate the operations described in this disclosure. Each agent 120 may run on a computing device 130. For example, each agent 120 may be an application installed on the respective computing device. However, alternatively, an agent 120 may include specialized hardware, other software, or a combination of hardware and software. Each agent 120 may perform or facilitate operations described in this disclosure as relating to the respective computing device 130. In some embodiments of the invention, the agents 120 and the cloud 110 may work together to perform the operations of the auditing system 100. One of skill in the art will understand that the various tasks herein may be distributed between the cloud 110 and the agents 120 and, further, will understand the various ways in which this distribution can occur.

Each computing device 130 may be a personal device, such as a smartphone, tablet, notebook computer, or desktop computer. Generally, each user may be associated with one or more computing devices 130. Each user may be an auditor and may store audit data 140 on an associated computing device 130. This audit data 140 may include, for example, audit notes, categorization of audit notes, and user ratings for items in the audit. In other words, the audit data 140 of a user may be input by the user to describe the audit as the audit proceeds. The respective agent 120 of a computing device 130 may access the audit data 140 to perform the operations described in this disclosure. In some embodiments of the invention, the audit data 140 is written and stored through the respective agent 120 on the computing device 130. One or more times, as will be described further below, the audit data 140 on a computing device 130 may be synchronized, which may include uploading the audit data 140 to the cloud 110 or directly sharing the audit data 140 with one or more other computing devices 130.

The cloud 110 may perform centralized storage and calculations. For example, and not by way of limitation, the audit data 140 on the computing devices 130 may be synchronized to the cloud 110, which may store audit data 140 from the various computing device 130, either separately or as an aggregate. Further, the cloud 110 may perform some or all of the calculations described below with respect to determining ratings. It will be understood, however, that the auditing system 100 may be implemented without a cloud 110. For instance, the various computing devices 130 may connect directly with one another to transfer information among their agents 120, and calculations may be performed locally at one or more computing devices 130.

The agent 120 may have two modes: user mode and leader mode. In user mode, the agent 120 may generate audit data 140, may access audit data 140 on the local computing device 130 on which the agent 120 is running, and may synchronize the audit data 140 with the cloud 110. In some embodiments of the invention, only a one-way synchronization is allowed, where audit data 140 is synchronized from the computing device 130 to the cloud 110, but not in the other direction. In other words, uploads may be allowed, but downloads may be restricted or disallowed. However, in some embodiments, two-way synchronization may be allowed. Further, a user may turn off automatic synchronization, such that synchronization occurs only at the user's manual prompting or on a schedule indicated by the user. In user mode, the agent 120 may have access to information about the user. As will be described further below, each user may be assigned an auditor expertise index. Each user may have a user profile accessible by the respective agent 120 on the user's local computing device, and that user profile may include the user's auditor expertise index. For example, and not by way of limitation, user profiles of each user may be stored in the cloud 110, and when a user logs into an agent 120, the agent 120 may access that user profile to determine information about the user. For another example, the user may simply manually enter information about himself, such as his auditor expertise index. The agent 120 may thus have access to the user's auditor expertise index or other information about the user.

The agent 120 may include a visualization system 125, which may generate and display one or more visualizations related to an audit and based on audit data 140 of the various users on the team. For example, as described further below, the visualization system 125 may be responsible for generating a graphic describing the distribution of discrete ratings for one or more items in the audit. This visualization system 125 may be accessible in user mode, in some embodiments of the invention, or alternatively only in leader mode. Like the agent 120 itself, the visualization system 125 may include hardware or software, or a combination of both.

In leader mode, the agent 120 may perform tasks available in user mode, as well as additional operations to facilitate the consolidation of audit data 140 or generation of one or more ratings. For a given audit, various agents 120 participating in the audit may be involved in the audit while running on various computing devices 130. Of those agents 120, however, in some embodiments of the invention, only a single such agent 120 may act as the leader agent 120 (i.e., running in leader mode) at a given time. However, the agent 120 running in leader mode may change from time to time while an audit proceeds. Determining the leader agent 120 may be performed in various ways. For example, two or more agents 120 may indicate that they are participating in a particular audit, or a particular portion of an audit, and as such those two or more agents 120 may be deemed by the auditing system 100 to be working together on a team. Of those deemed to be working together, the auditing system 100 may automatically assign a leader agent. For example, and not by way of limitation, the agent 120 corresponding to the user with the highest auditor expertise index may be the leader agent 120, thus making the user with the highest auditor expertise index the leader. Alternatively, one or more established organization rules may be followed to determine which user should be the leader and, thus, which agent 120 should be the leader agent 120. For another example, an agent 120 may receive an indication from a user that the agent 120 is meant to run in leader mode, and as a result, the agent 120 may become the leader agent. If a first agent 120 is already the leader agent 120 when an instruction is received for a second agent 120 to become the leader agent 120, then the auditing system 100 may switch the first agent 120 into user mode when switching the second agent 120 into leader mode. However, this may require permission from the second agent 120, in some embodiments of the invention.

The leader agent 120 may determine settings for the audit or may initiate tasks for the audit as a whole or for individual users of the other agents 120. These settings may be received the user of the leader agent 120 and propagated as needed to other agents 120 or to the cloud 110. For example, and not by way of limitation, a leader may indicate to the leader agent 120 the type of audit that is being performed (e.g., scores or discrete ratings, checklist or freeform). This setting may then be propagated to the other agents 120, which may then enable entry of the appropriate type of ratings (e.g., scores or discrete ratings) for the audit. Also, the type of audit may determine how final ratings are calculated, as will be described further below.

The leader agent 120 may initiate compilation, such may include consolidation of audit data 140, generation of final ratings, or both. Such consolidation or generation may then be performed, for example, at the cloud 110 or at the leader agent 120. The leader agent 120 may prompt these tasks automatically (e.g., according to a schedule), upon request from the leader, or both.

To consolidate audit data 140, the auditing system 100 may ensure that the synchronized audit data 140 of each agent 120 is up to date. To that end, for example, the various agents 120 may automatically upload their respective audit data 140 to the cloud 110 or, before doing so, may prompt their respective users for permission to do so. The auditing system 100 may consolidate, in an organized manner, as described below, the audit notes or other data in the audit data 140 of the various users.

In a checklist audit, each checklist item may be associated with a unique identifier, which may be associated with that item in each set of audit data 140. Thus, consolidating audit data 140 may include consolidating audit notes, or other audit data 140, associated with each item. This may result in a consolidated checklist, with each item being associated with audit data 140 for that item from the various users and, further, with each user's audit data 140 for an item still being associated with the respective user. In some embodiments of the invention, if the audit data is stored in a databased table, this consolidation may be performed through a left join table operation. The primary keys in the new table may be the unique identifiers as well as user identifiers.

In a freeform audit, because users are not required to respond to checklist items, the auditing system 100 may assign a unique note identifier to each note, or observation, made by the various users. Further, users may be required to assign a category, from among an established set of available categories, to each note. Thus, the audit data 140 for a user may include a plurality of audit notes, each having a note identifier and being assigned to a category. To consolidate these audit notes, the auditing system 100 may group together the various notes within each category, while retaining the association between each note and each respective user. In some embodiments of the invention, the auditing system 100 may merge notes that are deemed similar, thus creating a single observation from two or more individual notes, regardless of whether such notes come from the same or different users. Determining whether a first note and a second note are similar, and should thus be merged, may be performed through various mechanisms. For example, and not by way of limitation, the leader agent 120 may display the various notes in the combined audit data 140 to the leader, and the leader may indicate to the leader agent 120 which notes are similar and should thus be merged. For another example, natural language processing may be used to determine the similarity between notes. In this case, the leader agent 120 may prompt the leader to approve the merging of notes before such merging proceeds.

In some embodiments of the invention, the calculation of ratings utilizes various variables and formulas, which are described below. Each user who is an auditor may be assigned an auditor expertise index, also referred to herein as an index. The auditor expertise index assigned to, and thereby associated with, a user may be based on the user's level of experience or trustworthiness of the auditor. In some embodiments of the invention, the auditor expertise indices are positive integers, but one of skill in the art will understand how to adapt the operations described in this disclosure based on other types of auditor expertise indices. For example, and not by way of limitation, an apprentice may be assigned an auditor expertise index of 1, a practitioner may be assigned an auditor expertise index of 2, and an expert may be assigned an auditor expertise index of 3. In some embodiments of the invention, the auditor expertise index assigned to a user is dynamic and can be adjusted as needed, such as based on changes to the user's experience or historical record of reliable audit data 140.

Based in part on the respective auditor expertise index, each user may be assigned an auditor weight, which may also be based on auditor expertise indices of other users on the team. The auditor weight may represent how heavily the user's audit data 140 is weighted when establishing final ratings for the audit. Where there are a total of N users on a team, each with associated audit data 140, the following formula may be used to calculate the weight $W_u$ of the $u^{th}$ user, who has an auditor expertise index of $I_u$:

$$W_u = \frac{I_u \times f_u}{\sum_{n=1}^{N}(I_n \times f_n)}$$

In the above formula for the weight of a user, $f_u$, and $f_n$, are the fine-tuning indices for, respectively, users u and n. Generally, the above formula calculates the portion of the combined products of auditor expertise indices and fine-tuning indices (i.e., the denominator of the above formula) that is taken by the product of a current user's auditor expertise index and fine-tuning index. In other words, a user's weight may be calculated as the contribution, or ratio, of that user's fine-tuned auditor expertise index to the total of all fine-tuned auditor expertise indices.

In some embodiments of the invention, there may be a correspondence between auditor expertise indices and fine-tuning indices. Specifically, a user's auditor expertise index may determine, by way of a mapping, the user's fine-tuning index. Thus, multiple users with common auditor expertise indices may similarly have a common fine-tuning index. In some embodiments of the invention, if no fine-tuning is desired, the fine-tuning index may be 1 for all auditor expertise indices and for all users. In that case, a variation across users' auditor expertise indices may still result in varying auditor weights for the users. Alternatively, however, if it is desired to increase the weight of users having a certain auditor expertise index, then the corresponding fine-tuning index for users with that auditor expertise index may be increased to a value greater than one. Analogously, if it is desired to decrease the weight of users having a certain auditor expertise index, then the corresponding fine-tuning index for users with that auditor expertise index may be decreased to a value less than one. For example, and not by way of limitation, the following table shows example auditor expertise indices and fine-tuning indices for three classes of users:

| Auditors | Auditor Expertise Index | Fine-Tuning Index |
|---|---|---|
| Experts | 3 | 1.2 |
| Practitioners | 2 | 1 |
| Apprentices | 1 | 0.8 |

If the audit is score-based (i.e., uses score ratings), then a distinct score may be determined for each item in the audit. In a checklist audit, each item to be scored may be a portion of the checklist, such as a question or statement requiring a response. A final score may be calculated for each question or other item in the checklist, based on user scores provided by the users. In a freeform audit, each observation may be treated as an item. In that case, a final score may be calculated for each observation, based on user ratings provided by the users. In some embodiments of the invention, because observations merged together are treated as a single observation, one score may be calculated for each resulting merged observation. However, it will be understood that, in freeform audits, scoring is rare and potentially impractical.

For item m, of a total M items to be considered (e.g., M total checklist items, M total freeform categories), each user may have determined a user score for each item in the checklist. For example, these scores by the users may be determined individually by each user, using a process that may be personal to the user or may be established for all users, such as by an employer or standards organization. The scores may be determined individually by the users, manually or automatically. However, the auditing system 100 may utilize the user scores to determine a final score for each item. $S(m,n)$ denotes the score that user n determined for item m of the audit. In some embodiments of the invention, where there are a total of N auditors, the final score $S_m$ for item m is calculated as follows: $S_m = \Sigma_{n=0}^{N}(S(m,n) \times W_u)$. In other words, the final score for item m may be a weighted combination of the various user scores, with weights equal to the auditor weights of the users. For each item m for which at least one user has not determined a user rating, when calculating the final score for that item m, the auditor weights may be recalculated to exclude the users without user ratings. The final score $S_m$ may then be calculated without the non-rating users and with a total number of users equal to N less the non-rating users. The calculation of a final score may be performed for each item in the audit, thus determining scores for all items. As mentioned above, the final score for an item need not be used as-is. Rather, the leader or another authorized individual may use the final score of an item as a recommended score for that item.

Figure 2:
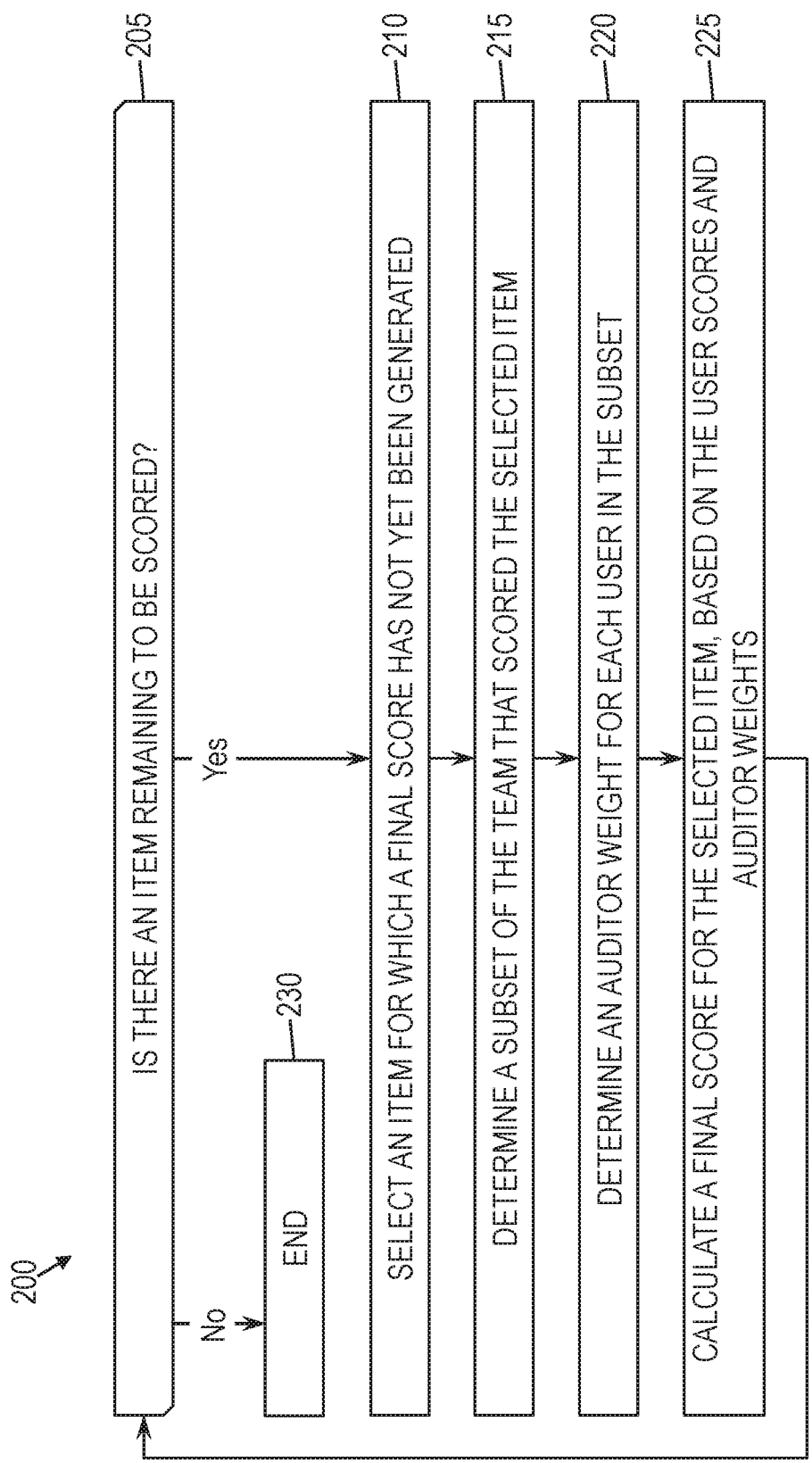
FIG. 2 is a flow diagram of a method of generating scores for items in an audit, according to some embodiments of the invention.

FIG. 2 is a flow diagram of a method 200 of generating scores for items in an audit, according to some embodiments of the invention. As shown in FIG. 2, at decision block 205, it may be determined whether an item exists for which a final score has not yet been generated. If no such item exists, then the method 200 may proceed to block 230, where the method 200 ends because all ratings have been determined. If such an item exists, then at block 210, an item for which a final score has not yet been generated may be selected. At block 215, it may be determined which subset of the team assigned a respective user score to the selected item. At block 220, an auditor weight may be determined for each user in the subset of the team, based on the users in the subset only. However, if the entire team scored the selected item, then block 220 may be skipped, and pre-established auditor weights based on the team as a whole may be used. At block 225, a final score for the selected item may be calculated as the sum of, for each user in the subset, the respective user score times the respective auditor weight. The method 200 may then return to block 205 to determine whether items remain to be scored. If no such items remain, then the method may end at block 230.

In some cases, as discussed above, discrete ratings may be used in the audit rather than scores. In a freeform audit, it may be more practical to use discrete ratings rather than scores; however, discrete ratings may be used for checklist audits as well. In a freeform audit, a final rating may be calculated for each observation, based on user ratings provided by the users. In a checklist audit, a final score may be calculated for each question or other item in the checklist, based on user ratings provided by the users.

With discrete ratings, a set of D available ratings may be established, and for each item, each user may provide a user rating selected from those in the set. For example, and not by way of limitation, the following set may be used for a total of six available ratings: [Major, Minor, Improvement, No Concern, Positive, Request for Information]. Each available rating may be assigned a unique identifier. In some embodiments of the invention, the unique identifiers may be consecutive integers, such that the numbers [1, D] represent the D available discrete ratings. For each item to be rated, the auditing system 100 may construct a final vector of D elements, or fields, representing the D possible ratings.

In some embodiments of the invention, the final vector for an item may be a weighted combination of user vectors for the item, where each user vector represents a corresponding user's discrete rating for the item. For an item m, for a user n, the user vector may be as follows: $[R_1(m,n), R_2(m,n), \ldots, R_D(m,n)]$. In this user vector, each field may have either a zero or non-zero value. For example, $R_x(m,n)=1$, or another non-zero value, if user n rates item m with the discrete rating corresponding to the identifier x, and $R_x(m,n)=0$ for all other x. In other words, in some embodiments of the invention, each user vector has D fields, with one field representing each discrete rating, where each field has a value of 0 except for the field representing the user's discrete rating for the current item, which has a value of 1 or another non-zero value.

For each item, a final vector may be determined based on the various user vectors associated with that item. For example, the final vector may be as follows: $[\Sigma_{n=1}^{N}(W_n \times R_1(m,n)), \Sigma_{n=1}^{N}(W_n \times R_2(m,n)), \ldots, \Sigma_{n=1}^{N}(W_n \times R_D(m,n))]$. In other words, the final vector may be a weighted combination, based on the respective auditor weights, of the various user vectors. In some embodiments of the invention, any user who does not provider a discrete rating for a particular item may be removed from the calculation of the final vector for that item. For example, the corresponding user vector of that user may be set to a zero vector, in which all fields have a value of zero, or no user vector need be provided for the user. In the latter case, the other users' auditor weights may be adjusted for the item as if the non-participating user does not exist. From the final vector, the auditing system 100 may select the discrete rating associated with the field having the highest value, and that selected rating may be used as the final rating. In other words, this may be viewed as a voting system, using weighted votes, in which the discrete rating with the most votes is selected as the final rating. If two or more discrete ratings are tied for the highest value in the final vector, then various mechanisms can be used to select between those discrete ratings. For example, the leader may be prompted to select from among the discrete ratings with the highest value in the final vector. For another example, from among those with the highest value in the final vector, the highest discrete rating, the lowest discrete rating, or the most common discrete rating may be selected as the advised rating. This calculation may be performed for each item (e.g., checklist item, freeform observation) in the audit. Further, as mentioned above, the final rating for an item need not be used as-is, but may be considered a recommendation only.

Figure 3:
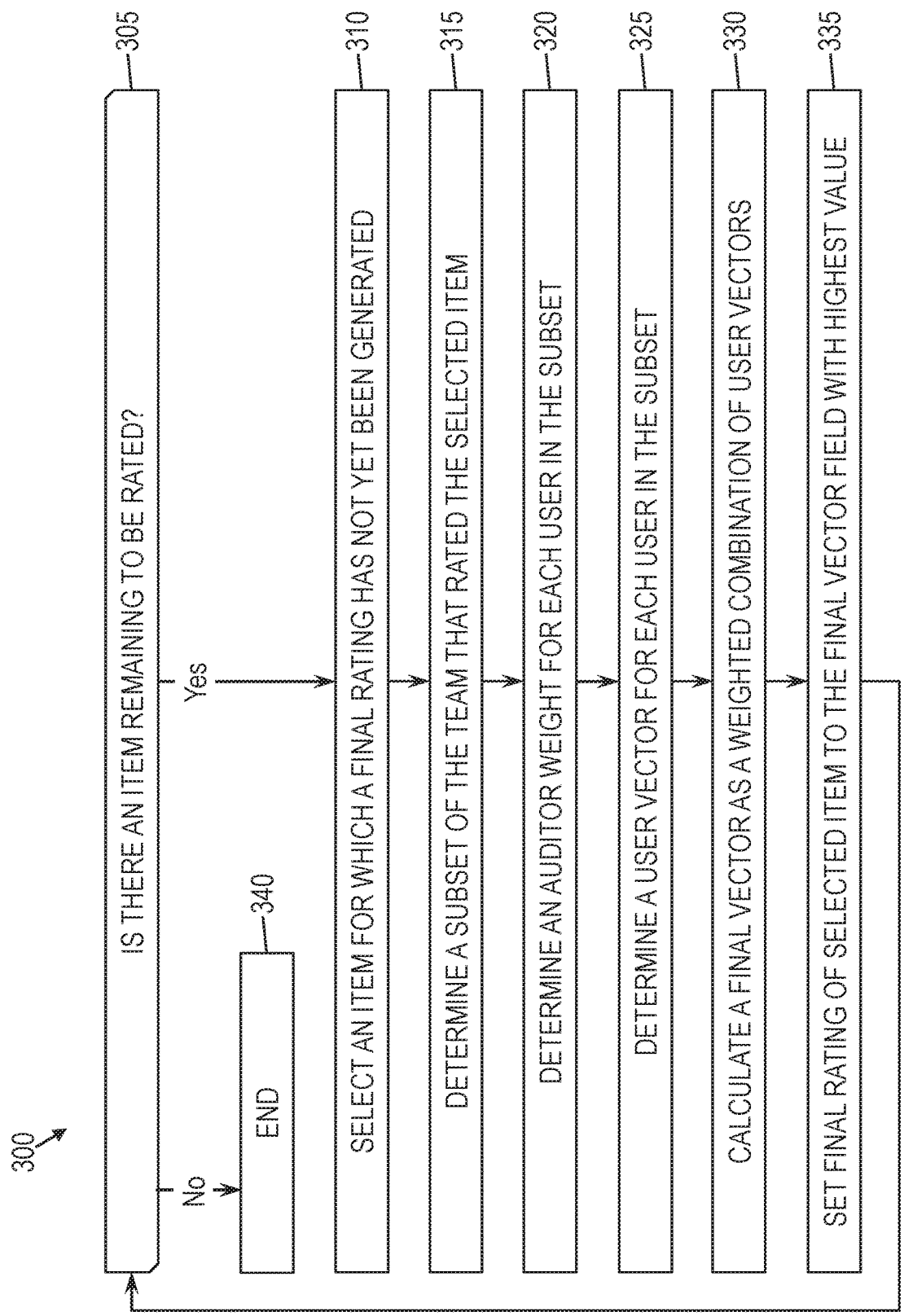
FIG. 3 is a flow diagram of a method of generating discrete ratings for items in an audit, according to some embodiments of the invention.

FIG. 3 is a flow diagram of a method 300 of generating discrete ratings for items in an audit, according to some embodiments of the invention. As shown in FIG. 3, at decision block 305, it may be determined whether an item exists for which a final rating has not yet been generated. If no such item exists, then the method 300 may proceed to block 340, where the method 300 ends because all ratings have been determined. If such an item exists, then at block 310, an item for which a final rating has not yet been generated may be selected. At block 315, it may be determined which subset of the team assigned a respective user rating to the selected item. At block 320, an auditor weight may be determined for each user in the subset of the team, based on the users in the subset only. However, if the entire team rated the selected item, then block 320 may be skipped, and pre-established auditor weights based on the team as a whole may be used. At block 325, a user vector may be determined for each user in the subset, where the user vector includes fields corresponding to available discrete ratings, and each field has a value of 0 unless the field corresponds to the respective user's rating. The field corresponding a respective user rating may have a value of 1 or some other non-zero value for that user. At block 330, a final vector for the selected item may be calculated as a weighted combination of the user vectors. At block 335, the final rating may be set to the discrete rating corresponding to the field having the highest value in the final vector. After determining the final rating for the selected item, the method 300 may return to block 305 to determine whether items remain to be rated. If no such items remain, then the method may end at block 340.

In some embodiments of the invention, the visualization system 125 may generate a visualization of this process of determining discrete ratings for the various items. Specifically, for instance, a stacked bar may be displayed in association with an item, where the stacked bar shows the percentage of the final vector corresponding to each discrete rating. In other words, the visualization system 125 may illustrate a distribution of the various users' discrete ratings.

For example, suppose there are three available discrete ratings: Major, Minor, and No Concern. The vector fields are assigned as follows: [Major, Minor, No Concern]. There are also three users, where Auditor 1 has an auditor weight $W_1=0.6$, Auditor 2 has an auditor weight $W_2=0.3$, and Auditor 3 has an auditor weight $W_3=0.1$. For item m, Auditor 1 assigns a discrete rating of Minor and has a user vector of [0, 1, 0], Auditor 2 assigns a discrete rating of No Concern and has a user vector of [0, 0, 1], and Auditor 3 assigns a discrete rating of Major and has a user vector of [1, 0, 0]. Therefore, using the auditor weights to calculate the final vector from the user vectors, the final vector is as follows: [0.1, 0.6, 0.3]. In this example, based on this distribution, the final rating is selected to be Minor, which is represented by the second field in the final vector.

Figure 4:
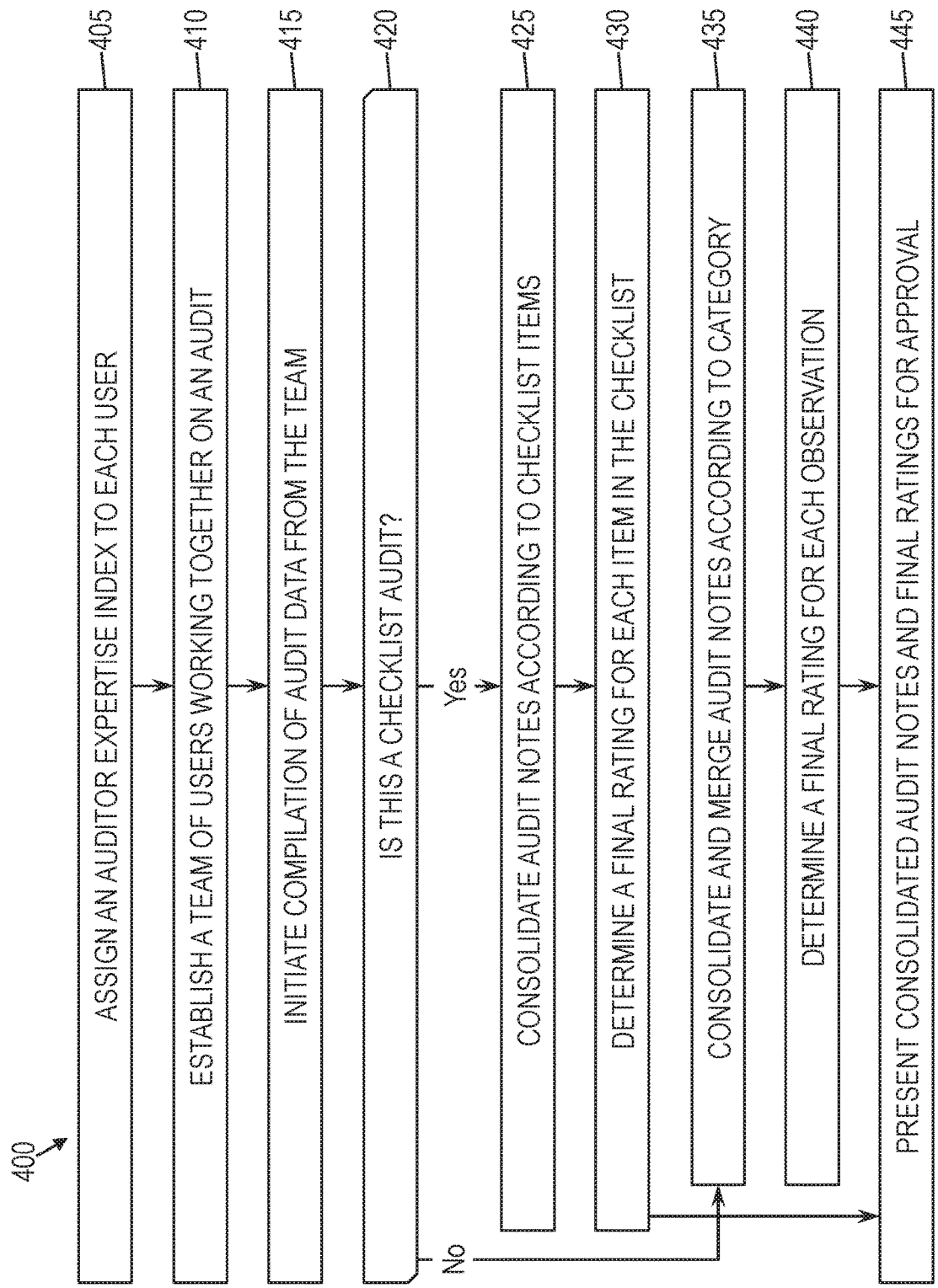
FIG. 4 is a flow diagram of a method of compiling audit data, according to some embodiments of the invention.

In summary, FIG. 4 is a flow diagram of a method 400 of compiling audit data 140, according to some embodiments of the invention. As shown in FIG. 4, at block 405, various users may each be assigned an auditor expertise index. At block 410, a team of users may be established as working together on an audit, where each user has an associated auditor expertise index. At block 415, during or after the audit, compilation of audit data 140 may be initiated. At decision block 420, it may be determined whether the audit is a checklist audit. This determination may be made, for example, based on settings for the audit or based on detection of whether a checklist is used in the various audit data 140. If it is a checklist audit, then at block 425, the audit notes in the audit data 140 of the users on the team may be consolidated according to checklist items. Further, at block 430, a rating may be determined for each item in the checklist, based on the ratings of the users on the team. However, if the audit is not a checklist audit but a freeform audit, then at block 435, the audit notes in the audit data 140 of the users on the team may be consolidated according to the category, potentially with some audit notes within each category being merged together. Further, at block 440, a rating may be determined for each observation, based on the ratings of the users on the team. At block 445, the consolidated audit notes and the final ratings may be presented for approval or modification. For instance, these may be presented to the leader through the leader agent 120.

As a result of using the auditing system 100, auditors are able to have their notes and ratings compiled in an efficient and useful manner. Further, auditors are able to retain control of the audit's conclusions by modifying final ratings and combining audit notes as needed.

Figure 5:
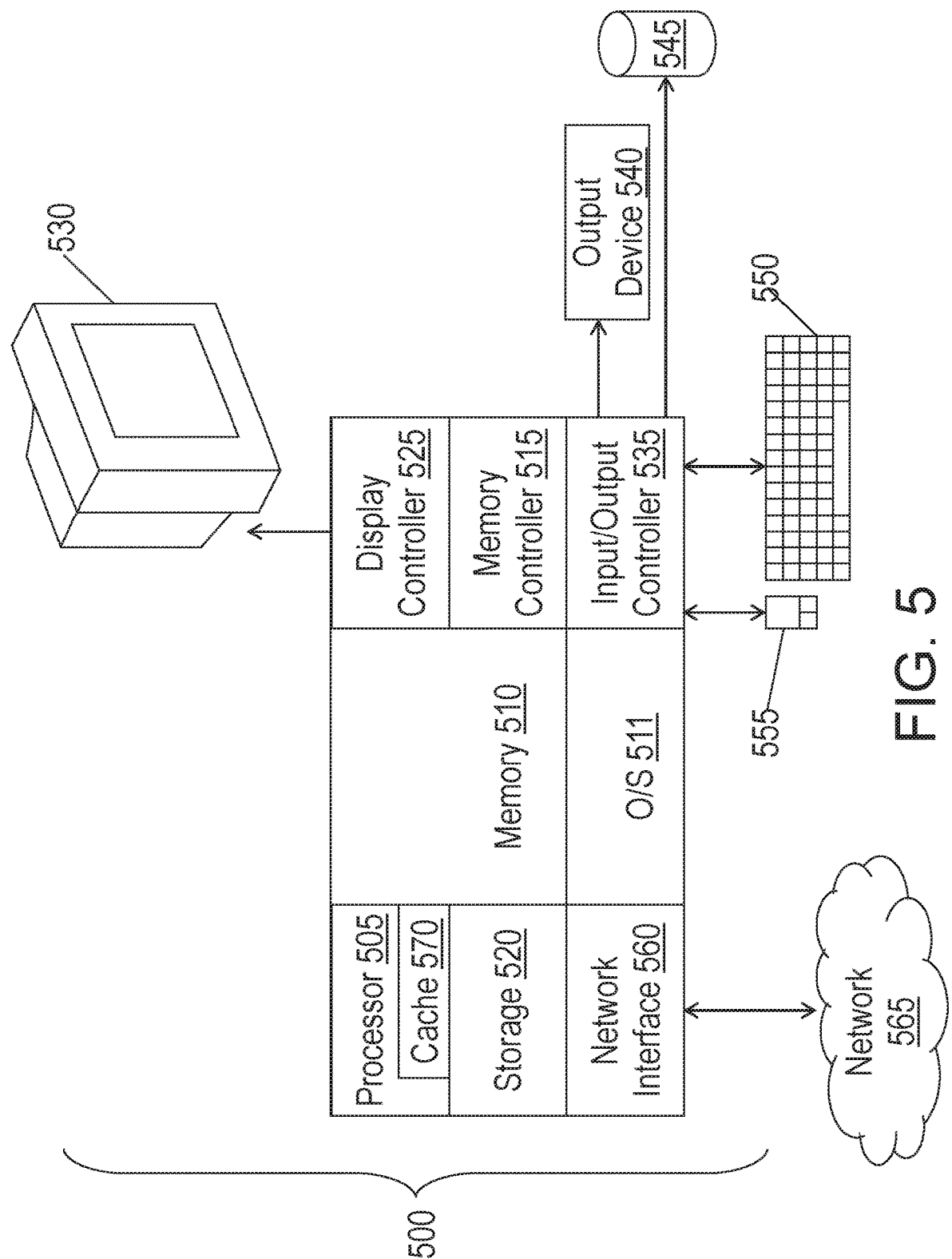
FIG. 5 is a block diagram of a computer system for implementing some or all aspects of the auditing system, according to some embodiments of this invention.

FIG. 5 is a block diagram of a computer system 500 for implementing some or all aspects of the system, according to some embodiments of this invention. The auditing systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For example, each server in the cloud 110 and each computing device 130 on which an agent 120 runs may be a computer system 500 as shown in FIG. 5.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the auditing systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Auditing systems 100 and methods according to this disclosure may be embodied, in whole or in part, in computer program products or in computer systems 500, such as that illustrated in FIG. 5.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
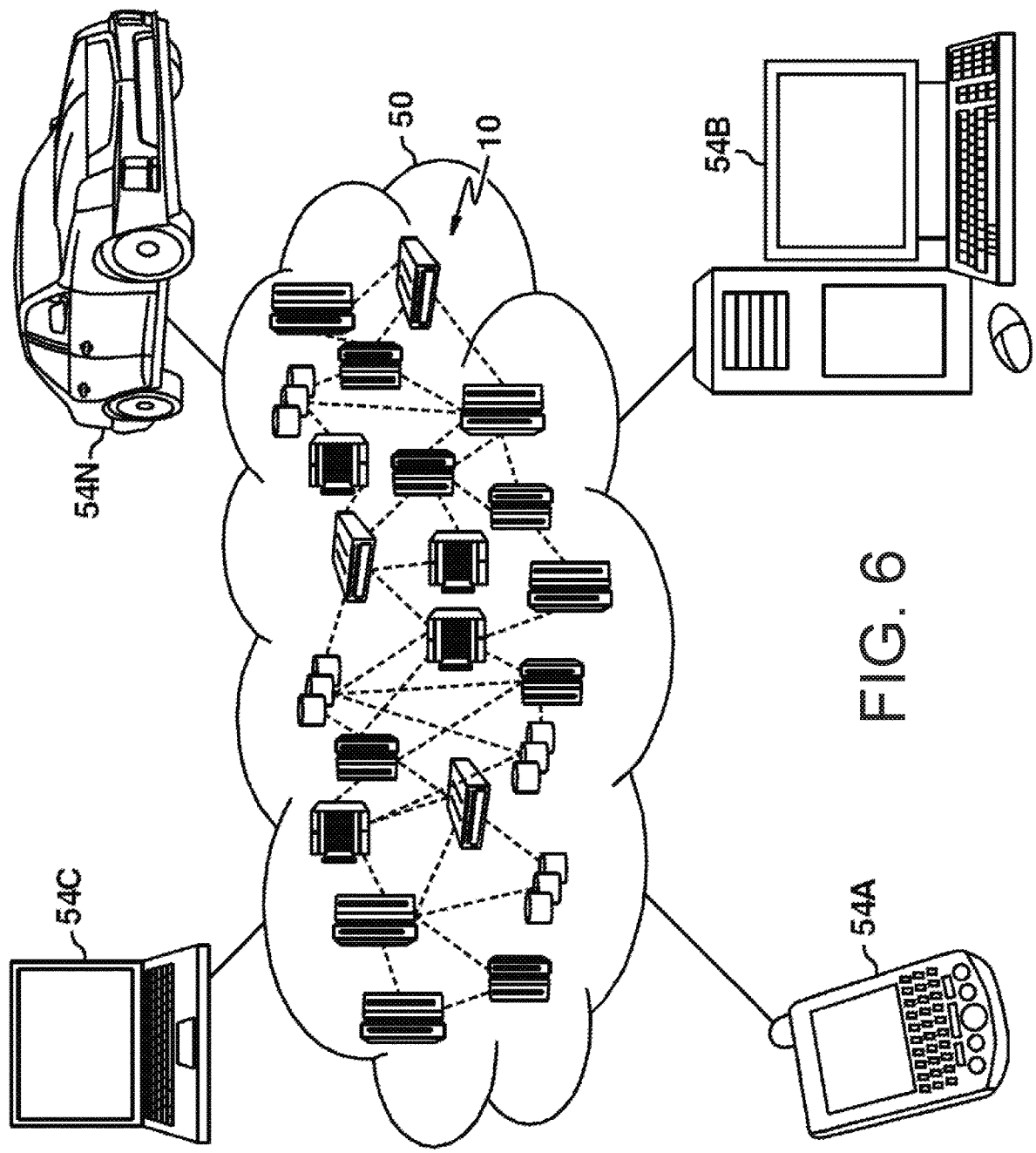
FIG. 6 is a block diagram of a cloud computing environment, according to some embodiments of this invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tasks associated with the auditing system 100 as described herein 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    assigning a respective auditor weight to be associated with each of a plurality of software agents, users being respectively associated with one of the plurality of software agents, the plurality of software agents comprising instructions configured to execute on processors and configured to access user profiles of the users;
    receiving a plurality of audit data from the plurality of software agents, wherein each audit data is associated with a respective user of the plurality of software agents and comprises a set of user ratings for an audit;
    wherein the audit comprises a plurality of items;
    generating a plurality of final ratings for the audit, wherein the plurality of final ratings comprise a respective final rating for each item in the audit;
    wherein generating the respective final rating of a first item in the audit comprises:
        identifying, in the plurality of audit data, a plurality of user ratings for the first item, wherein the plurality of user ratings for the first item comprise a respective user rating of the first item from each user of the plurality of software agents; and calculating the respective final rating of the first item based on a weighted combination of the plurality of user ratings for the first item, according to the respective auditor weight of each user;

assigning a lead software agent selected from among the plurality of software agents based on a highest auditor expertise score accessed by the plurality of software agents in the user profiles of the users, the highest auditor expertise score having been based at least in part on the respective auditor weight associated with each of the plurality of software agents, the lead software agent comprising instructions configured to determine settings for the audit and initiate tasks for other software agents of the plurality of software agents, the lead software agent being set to run in leader mode such that there is only one lead software agent at a time, the other software agents being set to run in user mode, wherein the generating the plurality of final ratings for the audit is performed based on an instruction from the lead software agent; and propagating the settings determined by the lead software agent to the other software agents.

2. The computer-implemented method of claim 1, wherein the assigning the respective auditor weight to each user of the plurality of software agents comprises:

assigning a respective auditor expertise index to each user of the plurality of software agents; and for each user of the plurality of software agents, determining a ratio of the respective auditor expertise index to a total of the respective auditor expertise indices of the plurality of software agents.

3. The computer-implemented method of claim 1, wherein the respective final rating of the first item is a discrete rating, and wherein the calculating the respective final rating of the first item further comprises:

determining a plurality of user vectors for the first item, wherein each respective user rating of a user for the first item is represented as a respective user vector of the plurality of user vectors;

wherein each user vector comprises two or more fields, each corresponding to an available discrete rating;

wherein, in a respective user vector of a user, the field corresponding to the respective user rating has a non-zero value;

wherein, in the respective user vector of a user, each field not corresponding to the respective user rating has a zero value; and calculating a final vector for the first item based on a weighted combination of the plurality of user vectors for the first item, according to the respective auditor weight of each user.

4. The computer-implemented method of claim 1, wherein the audit has a checklist-based flow, wherein the plurality of audit data comprises a plurality of audit notes, wherein the plurality of audit notes comprise respective audit notes of each user organized based on a checklist comprising a plurality of items, and further comprising:

consolidating the respective audit notes of the plurality of software agents, wherein the consolidating comprises, for each item on the checklist, grouping together each audit note associated with the respective item on the checklist.

5. The computer-implemented method of claim 1, wherein the audit has a freeform-based flow, wherein the plurality of audit data comprises a plurality of audit notes, wherein the plurality of audit notes comprise respective audit notes of each user organized into a plurality of categories, and further comprising:

consolidating the respective audit notes of the plurality of software agents, wherein the consolidating comprises, for each category, grouping together each audit note associated with the respective category.

6. The computer-implemented method of claim 5, further comprising:

determining that two or more audit notes within a first category are similar to each other; and merging the two or more audit notes into a single observation, based on the similarity and based on the two or more audit notes sharing the first category.

7. The computer-implemented method of claim 1, wherein the lead software agent comprises a visualization system responsible for generating a graphic related to the lead software agent, the visualization system being accessible in a leader mode.

8. A system comprising:

a memory having computer-readable instructions; and one or more processors for executing the computer-readable instructions, the computer-readable instructions comprising:

assigning a respective auditor weight to be associated with each of a plurality of software agents, users being respectively associated with one of the plurality of software agents, the plurality of software agents comprising instructions configured to execute on processors and configured to access user profiles of the users;

receiving a plurality of audit data from the plurality of software agents, wherein each audit data is associated with a respective user of the plurality of software agents and comprises a set of user ratings for an audit;

wherein the audit comprises a plurality of items;

generating a plurality of final ratings for the audit, wherein the plurality of final ratings comprise a respective final rating for each item in the audit;

wherein generating the respective final rating of a first item in the audit comprises:

identifying, in the plurality of audit data, a plurality of user ratings for the first item, wherein the plurality of user ratings for the first item comprise a respective user rating of the first item from each user of the plurality of software agents; and calculating the respective final rating of the first item based on a weighted combination of the plurality of user ratings for the first item, according to the respective auditor weight of each user;

assigning a lead software agent selected from among the plurality of software agents based on a highest auditor expertise score accessed by the plurality of software agents in the user profiles of the users, the highest auditor expertise score having been based at least in part on the respective auditor weight associated with each of the plurality of software agents, the lead software agent comprising instructions configured to determine settings for the audit and initiate tasks for other software agents of the plurality of software agents, the lead software agent being set to run in leader mode such that there is only one lead software agent at a time, the other software agents being set to run in user mode, wherein the generating the plurality of final ratings for the audit is performed based on an instruction from the lead software agent; and propagating the settings determined by the lead software agent to the other software agents.

9. The system of claim 8, wherein the assigning the respective auditor weight to each user of the plurality of software agents comprises:
assigning a respective auditor expertise index to each user of the plurality of software agents; and
for each user of the plurality of software agents, determining a ratio of the respective auditor expertise index to a total of the respective auditor expertise indices of the plurality of software agents.

10. The system of claim 8, wherein the respective final rating of the first item is a discrete rating, and wherein the calculating the respective final rating of the first item further comprises:
determining a plurality of user vectors for the first item, wherein each respective user rating of a user for the first item is represented as a respective user vector of the plurality of user vectors;
wherein each user vector comprises two or more fields, each corresponding to an available discrete rating;
wherein, in a respective user vector of a user, the field corresponding to the respective user rating has a non-zero value;
wherein, in the respective user vector of a user, each field not corresponding to the respective user rating has a zero value; and
calculating a final vector for the first item based on a weighted combination of the plurality of user vectors for the first item, according to the respective auditor weight of each user.

11. The system of claim 8, wherein the audit has a checklist-based flow, wherein the plurality of audit data comprises a plurality of audit notes, wherein the plurality of audit notes comprise respective audit notes of each user organized based on a checklist comprising a plurality of items, and the computer-readable instructions further comprising:
consolidating the respective audit notes of the plurality of software agents, wherein the consolidating comprises, for each item on the checklist, grouping together each audit note associated with the respective item on the checklist.

12. The system of claim 8, wherein the audit has a freeform-based flow, wherein the plurality of audit data comprises a plurality of audit notes, wherein the plurality of audit notes comprise respective audit notes of each user organized into a plurality of categories, and the computer-readable instructions further comprising:
consolidating the respective audit notes of the plurality of software agents, wherein the consolidating comprises, for each category, grouping together each audit note associated with the respective category.

13. The system of claim 12, the computer-readable instructions further comprising:
determining that two or more audit notes within a first category are similar to each other; and
merging the two or more audit notes into a single observation, based on the similarity and based on the two or more audit notes sharing the first category.

14. A computer-program product for audit advising, the computer-program product comprising a computer-readable storage medium having program instructions embodied therewith, the program instructions executable by a processor to cause the processor to perform a method comprising:
assigning a respective auditor weight to be associated with each of a plurality of software agents, users being respectively associated with one of the plurality of software agents, the plurality of software agents comprising instructions configured to execute on processors and configured to access user profiles of the users;
receiving a plurality of audit data from the plurality of software agents, wherein each audit data is associated with a respective user of the plurality of software agents and comprises a set of user ratings for an audit;
wherein the audit comprises a plurality of items;
generating a plurality of final ratings for the audit, wherein the plurality of final ratings comprise a respective final rating for each item in the audit;
wherein generating the respective final rating of a first item in the audit comprises:
identifying, in the plurality of audit data, a plurality of user ratings for the first item, wherein the plurality of user ratings for the first item comprise a respective user rating of the first item from each user of the plurality of software agents; and
calculating the respective final rating of the first item based on a weighted combination of the plurality of user ratings for the first item, according to the respective auditor weight of each user;
assigning a lead software agent selected from among the plurality of software agents based on a highest auditor expertise score accessed by the plurality of software agents in the user profiles of the users, the highest auditor expertise score having been based at least in part on the respective auditor weight associated with each of the plurality of software agents, the lead software agent comprising instructions configured to determine settings for the audit and initiate tasks for other software agents of the plurality of software agents, the lead software agent being set to run in leader mode such that there is only one lead software agent at a time, the other software agents being set to run in user mode, wherein the generating the plurality of final ratings for the audit is performed based on an instruction from the lead software agent; and
propagating the settings determined by the lead software agent to the other software agents.

15. The computer-program product of claim 14, wherein the assigning the respective auditor weight to each user of the plurality of software agents comprises:
assigning a respective auditor expertise index to each user of the plurality of software agents; and
for each user of the plurality of software agents, determining a ratio of the respective auditor expertise index to a total of the respective auditor expertise indices of the plurality of software agents.

16. The computer-program product of claim 14, wherein the respective final rating of the first item is a discrete rating, and wherein the calculating the respective final rating of the first item further comprises:
determining a plurality of user vectors for the first item, wherein each respective user rating of a user for the first item is represented as a respective user vector of the plurality of user vectors;
wherein each user vector comprises two or more fields, each corresponding to an available discrete rating;
wherein, in a respective user vector of a user, the field corresponding to the respective user rating has a non-zero value;
wherein, in the respective user vector of a user, each field not corresponding to the respective user rating has a zero value; and calculating a final vector for the first item based on a weighted combination of the plurality of user vectors for the first item, according to the respective auditor weight of each user.

17. The computer-program product of claim 14, wherein the audit has a checklist-based flow, wherein the plurality of audit data comprises a plurality of audit notes, wherein the plurality of audit notes comprise respective audit notes of each user organized based on a checklist comprising a plurality of items, and the method further comprising:

consolidating the respective audit notes of the plurality of software agents, wherein the consolidating comprises, for each item on the checklist, grouping together each audit note associated with the respective item on the checklist.

18. The computer-program product of claim 14, wherein the audit has a freeform-based flow, wherein the plurality of audit data comprises a plurality of audit notes, wherein the plurality of audit notes comprise respective audit notes of each user organized into a plurality of categories, and the method further comprising:

consolidating the respective audit notes of the plurality of software agents, wherein the consolidating comprises, for each category, grouping together each audit note associated with the respective category.

19. The computer-program product of claim 18, the method further comprising:

determining that two or more audit notes within a first category are similar to each other; and merging the two or more audit notes into a single observation, based on the similarity and based on the two or more audit notes sharing the first category.

* * * * *